US012663372B2

(12) United States Patent
Guler et al.

(10) Patent No.: US 12,663,372 B2
(45) Date of Patent: Jun. 23, 2026

(54) CALIBRATION OF AN OPTICAL DETECTOR USING A MICRO-FLOW CHAMBER

(71) Applicant: Kidde Fire Protection, LLC, Bradenton, FL (US)

(72) Inventors: Urcan Guler, Avon, CT (US); David L. Lincoln, Cromwell, CT (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 115 days.

(21) Appl. No.: 18/464,598

(22) Filed: Sep. 11, 2023

(65) Prior Publication Data

US 2023/0417666 A1      Dec. 28, 2023

Related U.S. Application Data

(62) Division of application No. 15/734,120, filed as application No. PCT/US2019/063522 on Nov. 27, 2019, now Pat. No. 11,879,840.

(60) Provisional application No. 62/778,099, filed on Dec. 11, 2018.

(51) Int. Cl.
*G01N 21/53* (2006.01)
*G01N 21/05* (2006.01)

(52) U.S. Cl.
CPC ............. *G01N 21/53* (2013.01); *G01N 21/05* (2013.01); *G01N 2201/127* (2013.01)

(58) Field of Classification Search
CPC ...... G01N 21/05; G01N 21/274; G01N 21/49; G01N 21/53; G01N 2201/127; G08B 17/107; G08B 29/145
See application file for complete search history.

(56) References Cited

U.S. PATENT DOCUMENTS

| | | | |
|---|---|---|---|
| 3,585,621 A | 6/1971 | Dicello et al. | |
| 3,693,401 A | 9/1972 | Purt et al. | |
| 3,949,234 A | 4/1976 | Vandermark | |
| 4,099,178 A | 7/1978 | Ranney et al. | |
| 4,249,244 A | 2/1981 | Shofner et al. | |
| 4,306,575 A | 12/1981 | Minozzi, Jr. | |
| 4,870,394 A | 9/1989 | Corl et al. | |
| 5,123,738 A | 6/1992 | Yonemura | |

(Continued)

FOREIGN PATENT DOCUMENTS

| | | |
|---|---|---|
| CN | 2182407 U | 11/1994 |
| CN | 2462380 U | 11/2001 |

(Continued)

OTHER PUBLICATIONS

International Search Report of the International Searching Authority; International Application No. PCT/US2019/063517; International Filing Date: Nov. 27, 2019; Date of Mailing: Feb. 28, 2020; 4 pages.

(Continued)

*Primary Examiner* — Tri T Ton
(74) *Attorney, Agent, or Firm* — CANTOR COLBURN LLP

(57) ABSTRACT

A method of calibrating an optical detector includes installing a calibration system within at least one sensing volume of the optical detector, filling a chamber of the calibration system with a material to achieve a known obscuration, and measuring an obscuration of the material within the chamber.

11 Claims, 9 Drawing Sheets

(56) References Cited

U.S. PATENT DOCUMENTS

| | | | |
|---|---|---|---|
| 5,413,915 A | 5/1995 | Case et al. | |
| 5,473,314 A | 12/1995 | Mochizuki et al. | |
| 5,497,144 A | 3/1996 | Schappi et al. | |
| 5,670,946 A | 9/1997 | Ellwood et al. | |
| 6,396,405 B1 | 5/2002 | Bernal et al. | |
| 6,692,916 B2 | 2/2004 | Bevilacqua et al. | |
| 7,111,496 B1 | 9/2006 | Lilienfeld et al. | |
| 7,167,098 B2 | 1/2007 | Siber et al. | |
| 7,212,734 B2 | 5/2007 | Pepper et al. | |
| 7,224,284 B2 | 5/2007 | Mi et al. | |
| 7,587,926 B2 | 9/2009 | Ackerman | |
| 7,616,126 B2 | 11/2009 | Kadwell et al. | |
| 8,205,478 B1 | 6/2012 | Hallisey | |
| 8,383,043 B2 * | 2/2013 | Padmanabhan .... | G01N 15/1459 |
| | | | 436/63 |
| 8,896,835 B2 | 11/2014 | Ido et al. | |
| 8,937,718 B2 | 1/2015 | Sieg et al. | |
| 9,183,737 B1 | 11/2015 | Billman | |
| 9,652,958 B2 | 5/2017 | Zribi et al. | |
| 11,788,942 B2 * | 10/2023 | Deliwala ............... | G01N 15/06 |
| | | | 356/343 |
| 2001/0038338 A1 | 11/2001 | Kadwell et al. | |
| 2003/0001746 A1 * | 1/2003 | Bernal ................. | G08B 17/113 |
| | | | 340/630 |
| 2004/0074279 A1 * | 4/2004 | Forrest ............... | G01N 33/0006 |
| | | | 702/100 |
| 2006/0007010 A1 | 1/2006 | Mi et al. | |
| 2009/0075248 A1 | 3/2009 | Debreczeny et al. | |
| 2009/0095901 A1 * | 4/2009 | Robinson ............. | G01N 27/622 |
| | | | 250/288 |
| 2009/0188296 A1 | 7/2009 | D'Amico et al. | |
| 2010/0315638 A1 | 12/2010 | Goohs et al. | |
| 2012/0140231 A1 | 6/2012 | Knox et al. | |
| 2012/0242993 A1 | 9/2012 | Schick et al. | |
| 2013/0071290 A1 * | 3/2013 | Goldstein ............. | B82Y 30/00 |
| | | | 422/86 |
| 2013/0260372 A1 * | 10/2013 | Buermann ............. | B01L 3/527 |
| | | | 435/6.1 |
| 2015/0330899 A1 * | 11/2015 | Vasdekis ................. | B32B 37/24 |
| | | | 427/64 |
| 2018/0149578 A1 | 5/2018 | Walls et al. | |
| 2018/0275052 A1 | 9/2018 | Walsh et al. | |
| 2019/0346356 A1 | 11/2019 | Karnik et al. | |
| 2021/0302311 A1 | 9/2021 | Guler et al. | |
| 2021/0364422 A1 | 11/2021 | Guler et al. | |
| 2021/0372922 A1 | 12/2021 | Guler et al. | |

FOREIGN PATENT DOCUMENTS

| | | |
|---|---|---|
| CN | 102998425 A | 3/2013 |
| CN | 103514723 A | 1/2014 |
| CN | 104637234 A | 5/2015 |
| CN | 105938649 A | 9/2016 |
| CN | 107543613 A | 1/2018 |
| DE | 102009046556 A1 | 5/2011 |
| EP | 1376506 A1 | 1/2004 |
| EP | 2600139 A1 | 6/2013 |
| EP | 2846150 A1 | 3/2015 |
| EP | 2873964 A1 | 5/2015 |
| GB | 2095821 A | 10/1982 |
| GB | 2283727 B | 5/1995 |
| GB | 2557246 A | 6/2018 |
| JP | 2006024064 A | 6/2005 |
| JP | 5167047 B2 | 3/2013 |
| JP | 6266047 B2 | 1/2018 |
| KR | 101736765 B1 | 5/2017 |
| WO | 9502230 A1 | 1/1995 |
| WO | 2008111895 A1 | 9/2008 |
| WO | 2017060716 A1 | 4/2017 |
| WO | 2018069473 A1 | 4/2018 |

OTHER PUBLICATIONS

International Search Report of the International Searching Authority; International Application No. PCT/US2019/063522; International Filing Date: Nov. 27, 2019; Date of Mailing: Feb. 28, 2020; 6 pages.

International Search Report of the International Searching Authority; International Application No. PCT/US2019/064902; International Filing Date: Dec. 6, 2019; Date of Mailing: Mar. 9, 2020; 6 pages.

JK Exports Defusing Dangers—Solo Detector Testers. Smoke Detector Testing. Retrieved from https://jkexportsindia.co.in/detector-testers?gclid=EAlalQobChMI_-X6w6203QIVIY2PCh1dpA5PEAAYASAAEgLKm_D_BwE. Date Accessed: Sep. 19, 2018. 9 Pages.

Killeen et al. "Alternative Calibration Process for Optical Smoke Detectors", Aug. 23, 2012, Worcester Polytechnic University, 57 pages.

U.S. Final Office Action; U.S. Appl. No. 15/734,120; Mailing Date: Aug. 30, 2022; 19 pages.

U.S. Final Office Action; U.S. Appl. No. 17/059,940; Mailing Date: May 6, 2022; 11 pages.

U.S. Non-Final Office Action; U.S. Appl. No. 15/734,120; Date of Mailing: Apr. 11, 2022; 27 pages.

U.S. Non-Final Office Action; U.S. Appl. No. 15/734,120; Mailing Date: Nov. 22, 2022; 15 pages.

U.S. Non-Final Office Action; U.S. Appl. No. 17/059,940; Mailing Date: Jul. 27, 2022; 12 pages.

U.S. Non-Final Office Action; U.S. Appl. No. 17/059,944; Date: May 11, 2022; 33 pages.

U.S. Non-Final Office Action; U.S. Appl. No. 17/059,940; Filing Date: Nov. 30, 2020; Date of Mailing: Jan. 7, 2022; 25 pages.

Written Opinion of the International Searching Authority; International Application No. PCT/US2019/063517; International Filing Date: Nov. 27, 2019; Date of Mailing: Feb. 28, 2020; 7 pages.

Written Opinion of the International Searching Authority; International Application No. PCT/US2019/063522; International Filing Date: Nov. 27, 2019; Date of Mailing: Feb. 28, 2020; 10 pages.

Written Opinion of the International Searching Authority; International Application No. PCT/US2019/064902; International Filing Date: Dec. 6, 2019; Date of Mailing: Mar. 9, 2020; 9 pages.

* cited by examiner

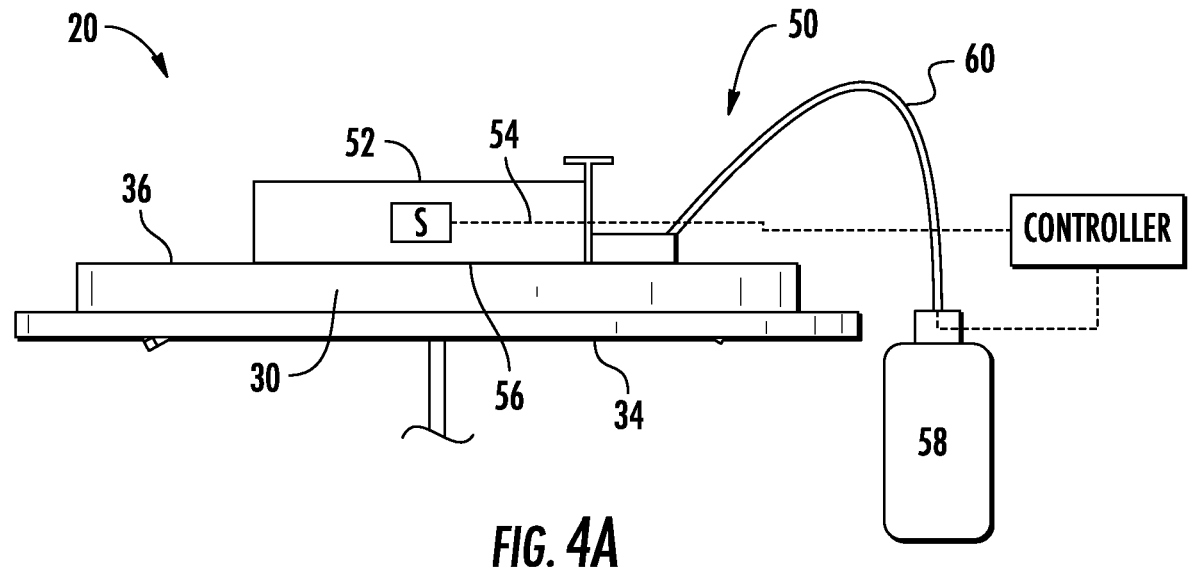
*FIG.* 4A

100

POSITION THE CALIBRATION
SYSTEM ABOUT THE DETECTOR — 102

PROVIDE A FLOW OF MATERIAL
TO THE CHAMBER 54 — 104

EMIT A LIGHT FROM ONE OR MORE LIGHT
SOURCES 22 OF THE DETECTOR 20 — 106

RECEIVE A SCATTERED LIGHT
FROM THE CHAMBER 54 — 108

DETERMINE AN OBSCURATION
BASED ON THE SCATTERED LIGHT — 110

COMPARE DETERMINED OBSCURATION
WITH PREDETERMINED THRESHOLD — 112

CALIBRATION OF AN OPTICAL DETECTOR USING A MICRO-FLOW CHAMBER

CROSS REFERENCE TO RELATED APPLICATIONS

This application is a division of U.S. application Ser. No. 15/734,120 filed Dec. 1, 2020, which is a National Stage Application of PCT/US2019/063522, filed Nov. 27, 2019, which claims the benefit of U.S. Provisional Application 62/778,099 filed Dec. 11, 2018, each of which are incorporated by reference in their entirety herein.

BACKGROUND

Embodiments of the present disclosure described herein generally relate to smoke detectors and, more particularly, to systems and methods for verifying operational integrity of smoke detectors.

Smoke detectors exist including a light source that produces and emits a light beam into an area being monitored. A photo detector is positioned to receive light that is scattered by smoke particles from the area being monitored. A processing circuit is associated with the light source and the photo detector to measure the amount of light received and evaluate whether one or more smoke particles are present.

The various components of the smoke detector contribute to the sensitivity of the detector and as a result, at the time of manufacture, the smoke detector requires calibration. Some of the main factors that lead to significant tolerance variations include the output of the LED light source and the orientation of the one or more light sources relative to the photo detector. Currently, smoke detectors are calibrated using "smoke boxes." The detector is installed within an enclosed chamber and is operated to sense the presence of the smoke surrounding the detector within the enclosure. This process is cumbersome, time consuming, and is not fully automated. Accordingly, there is a need for a system that will minimize the time required to calibrate a smoke detector.

BRIEF DESCRIPTION

According to an embodiment, a method of calibrating an optical detector includes installing a calibration system within at least one sensing volume of the optical detector, filling a chamber of the calibration system with a material to achieve a known obscuration, and measuring an obscuration of the material within the chamber.

In addition to one or more of the features described above, or as an alternative, in further embodiments measuring an obscuration of the material within the chamber further comprises: emitting a light from a light source of the detector, receiving scattered light from the chamber at a light sensing device, determining an obscuration of the material based on the scattered light, and comparing the obscuration with an allowable range.

In addition to one or more of the features described above, or as an alternative, in further embodiments comprising adjusting at least one parameter of the detector if the obscuration is outside of an allowable range.

In addition to one or more of the features described above, or as an alternative, in further embodiments installing a calibration system within the at least one sensing volume of the optical detector includes installing the calibration system adjacent a sensing surface of the optical detector.

In addition to one or more of the features described above, or as an alternative, in further embodiments installing the calibration system adjacent the sensing surface of the optical detector includes mounting a housing of the calibration system in direct contact with the sensing surface of the detector.

In addition to one or more of the features described above, or as an alternative, in further embodiments installing the calibration system adjacent the sensing surface of the optical detector includes mounting the optical detector within the chamber.

In addition to one or more of the features described above, or as an alternative, in further embodiments filling the chamber with a material to achieve a known obscuration includes dynamically controlling a flow of the material into the chamber.

In addition to one or more of the features described above, or as an alternative, in further embodiments filling the chamber with a material to achieve a known obscuration includes supplying a first material and a second material to the chamber and dynamically controlling the flow of at least one of the first material and the second material as it is supplied to the chamber.

In addition to one or more of the features described above, or as an alternative, in further embodiments comprising: filling the chamber of the calibration system with a second material having a known obscuration, and measuring an obscuration of the second material within the chamber.

In addition to one or more of the features described above, or as an alternative, in further embodiments measuring an obscuration of the second material within the chamber further comprises emitting a light from a light source of the detector, receiving scattered light from the chamber at a light sensing device, determining an obscuration of the second material based on the scattered light, and comparing the obscuration with a predetermined threshold.

In addition to one or more of the features described above, or as an alternative, in further embodiments filling the chamber of the calibration system with the second material further comprises evacuating the material from the chamber.

According to another embodiment, a calibration system for use with a detector includes a housing having an internal chamber, at least one reservoir arranged in fluid communication with the internal chamber, and a controller for selectively supplying a flow of material from the at least one reservoir to the internal chamber such that the internal chamber has a known obscuration.

In addition to one or more of the features described above, or as an alternative, in further embodiments the controller is operable to dynamically control the flow of material to the internal chamber from the at least one reservoir to achieve a desired light scattering property.

In addition to one or more of the features described above, or as an alternative, in further embodiments comprising a sensor operably coupled to the controller, the sensor being operable to detect an obscuration within the internal chamber.

In addition to one or more of the features described above, or as an alternative, in further embodiments the controller is operable to dynamically control the flow of material to the internal chamber in real time in response to the sensor.

In addition to one or more of the features described above, or as an alternative, in further embodiments the housing includes a plurality of surfaces and at least one of the plurality of surfaces is formed from a flexible, transparent material.

In addition to one or more of the features described above, or as an alternative, in further embodiments the plurality of surfaces includes a primary surface for contacting the detector, the primary surface having a contour complementary to a portion of the detector.

In addition to one or more of the features described above, or as an alternative, in further embodiments comprising an anti-reflective coating applied to the primary surface.

In addition to one or more of the features described above, or as an alternative, in further embodiments comprising an absorptive coating applied to at least one of the plurality of surfaces distinct from the primary surface.

In addition to one or more of the features described above, or as an alternative, in further embodiments the detector includes at least one sensing volume, and the internal chamber of the housing is sized to extend through the at least one sensing volume.

In addition to one or more of the features described above, or as an alternative, in further embodiments a first surface of the housing is positionable in direct contact with a sensing surface of the detector, the first surface having a contour complementary to the sensing surface of the detector.

In addition to one or more of the features described above, or as an alternative, in further embodiments the at least one reservoir includes a first reservoir filled with a first material and a second reservoir filled with a second material, the second material being distinct from the first material.

In addition to one or more of the features described above, or as an alternative, in further embodiments the detector is an optical detector.

In addition to one or more of the features described above, or as an alternative, in further embodiments the calibration system is mounted within a chamber of the detector.

In addition to one or more of the features described above, or as an alternative, in further embodiments the detector is mounted within the internal chamber of the housing.

BRIEF DESCRIPTION OF THE DRAWINGS

The following descriptions should not be considered limiting in any way. With reference to the accompanying drawings, like elements are numbered alike:

FIG. 4A is a side view of a chamberless optical detector including a calibration system according to an embodiment;

DETAILED DESCRIPTION

A detailed description of one or more embodiments of the disclosed apparatus and method are presented herein by way of exemplification and not limitation with reference to the Figures.

Referring now to the FIGS., an example of an optical detector 20 for detecting one or more conditions or events within a designated area to be monitored is illustrated. In the illustrated, non-limiting embodiment, the optical detector 20 is a chamber-less smoke detector. However, it should be understood that the optical detector 20 illustrated and described herein is intended as an example only and that other types of detectors, such as chambered optical detectors and duct detectors, are also contemplated herein.

It will be appreciated that a chamber-less smoke detector, where smoke is detected in the ambient adjacent to and outside of the detector rather than in a chamber within the body of the detector (as in a chambered detector), may provide additional benefits including, but not limited to reduction of transport time for smoke to reach the sensor elements to enable faster response/alarm times, improved sensitivity, increased functionality (as described below), manufacturability, and reproducibility, negligible directionality, ease of maintenance, and enhanced aesthetics for example. Additionally, it should be understood that in some embodiments, the detector 20 may be able to detect one or more hazardous conditions, including but not limited to the presence of smoke, fire, temperature, flame, microbials, or any of a plurality of pollutants, combustion products, or chemicals. Alternatively, or in addition, the detector 20 may be configured to perform monitoring operations of people, lighting conditions, or objects. In an embodiment, the detector 20 may operate in a manner similar to a motion sensor, such as to detect the presence of a person, occupants, or unauthorized access to the designated area for example. The conditions and events described herein are intended as an example only, and other suitable conditions or events are within the scope of the disclosure.

The optical detector 20 uses light to evaluate a volume for the presence of a condition. In this example, light is emitted into the designated area being monitored; when the light encounters an object (a person, smoke particle, or gas molecule for example), the light is scattered and/or absorbed due to a difference in the refractive index of the object compared to the surrounding medium (air). Observing any changes in the incident light can provide information about the designated area including determining the presence of a predetermined condition or event.

Figure 1:
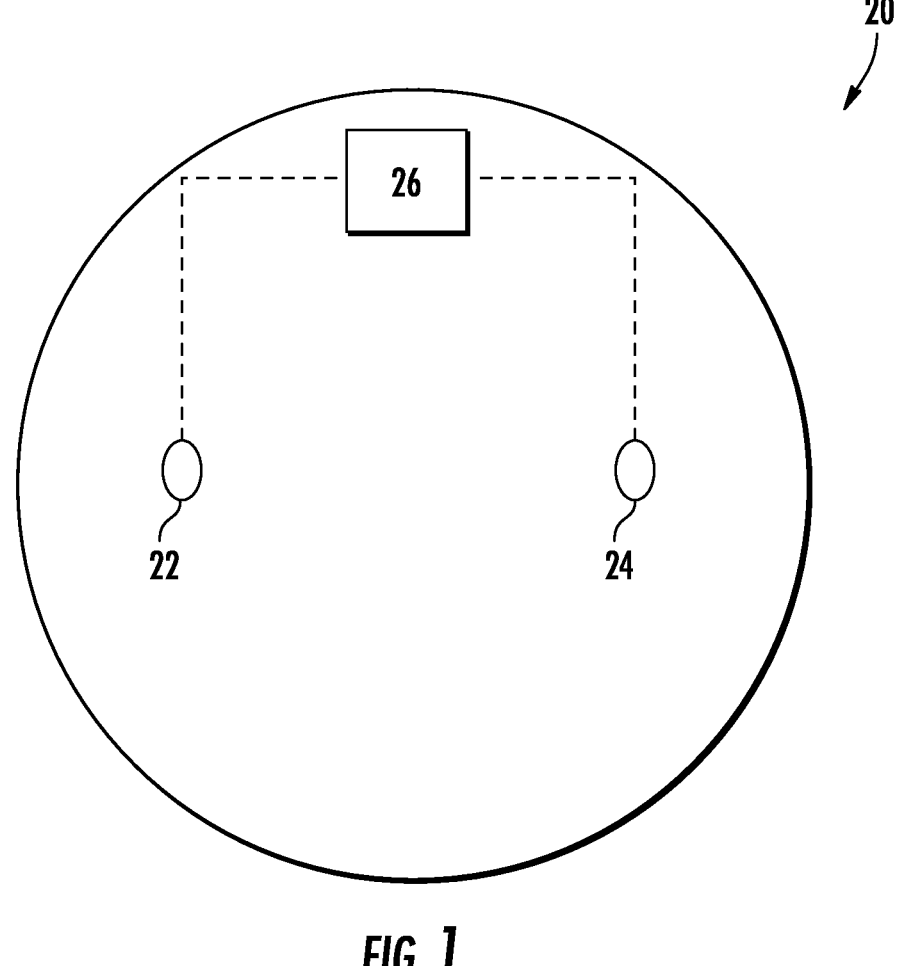
FIG. 1 is a schematic diagram of a chamberless optical detector according to an embodiment.

In its most basic form, as shown in FIG. 1, the detector 20 includes a light source 22, such as a light emitting diode (LED) for example, and a light sensing device 24, such as a photodiode for example. A processing device 26 is arranged in electrical communication with the at least one light source 22 and the at least one light sensing device 24. The processing device 26 includes a memory (not shown) capable of storing executable instructions. The executable instructions may be stored or organized in any manner and at any level of abstraction, such as in connection with one or more applications, processor, or routines, to analyze the signals detected by the plurality of sensors to make alarm decisions after preset threshold levels are reached according to the method described herein.

Figure 2:
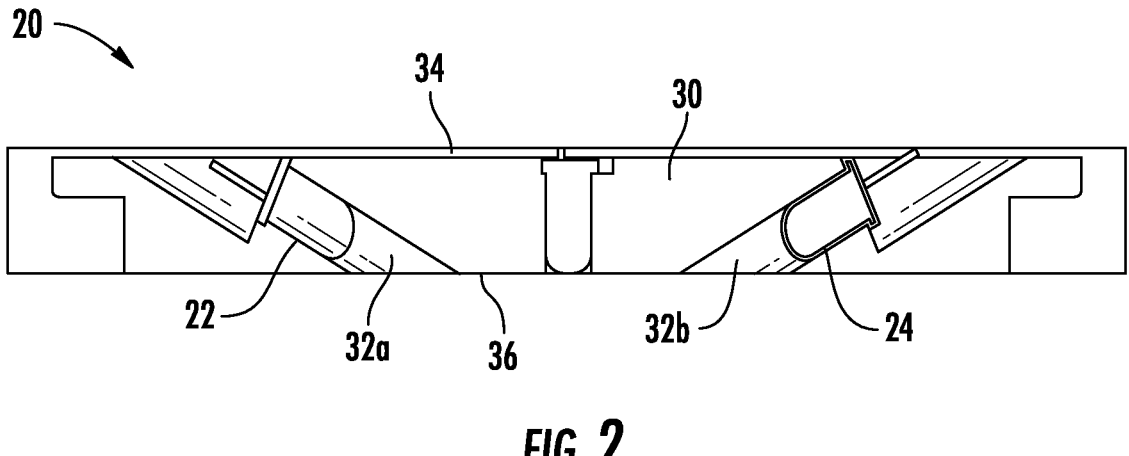
FIG. 2 is cross-sectional view of a chamberless optical detector according to an embodiment.

With reference now to FIG. 2, a cross-sectional view of the optical detector 20 is illustrated. As shown, the detector 20 further comprises a body or casing 30 having a plurality of channels 32 formed therein. The plurality of channels 32 extend generally from a first surface 34 of the body 30 to a second, opposite surface 36 of the body 30. The first surface 34 of the body 30 is typically positioned adjacent a supporting surface, such as a wall or ceiling for example, and the second surface 36 of the body 30 is typically arranged in communication with the area being monitored to determine the existence of a condition or event.

Each light source 22 may be mounted within one of the plurality of channels. In the illustrated, non-limiting embodiment, the light source 22 is mounted within a first channel 32*a*. Similarly, each of the one or more light sensing devices 24 is positioned within another of the plurality of channels 32 to receive light such that the portion of the at least one light sensing device 24 configured to receive a light signal is facing the second surface 36 and the area to be monitored. As shown, the light sensing device is positioned within a second channel 32*b* distinct from the first channel 32*a* containing the light source 22.

Figure 3A:
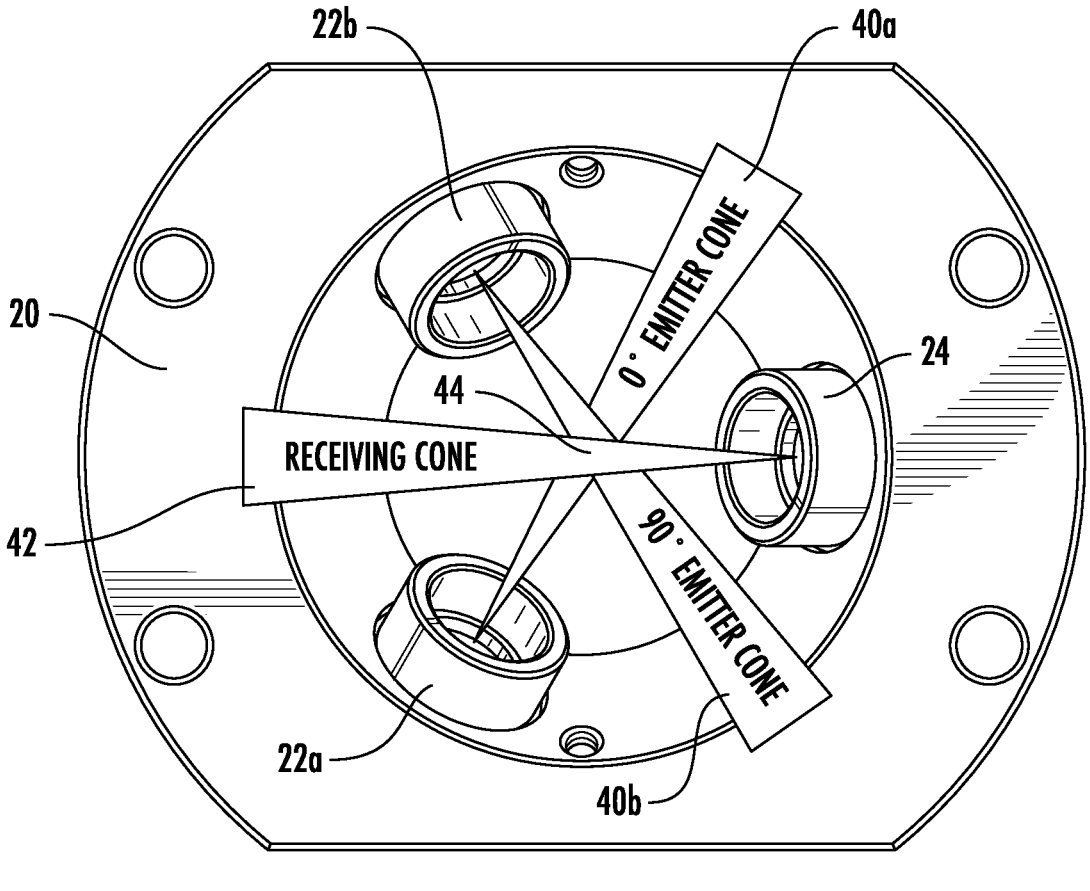
FIGS. 3A-3C are various views of the interaction between the emitter cones and receiving cones of the chamberless optical detector according to an embodiment.
Figure 3B:
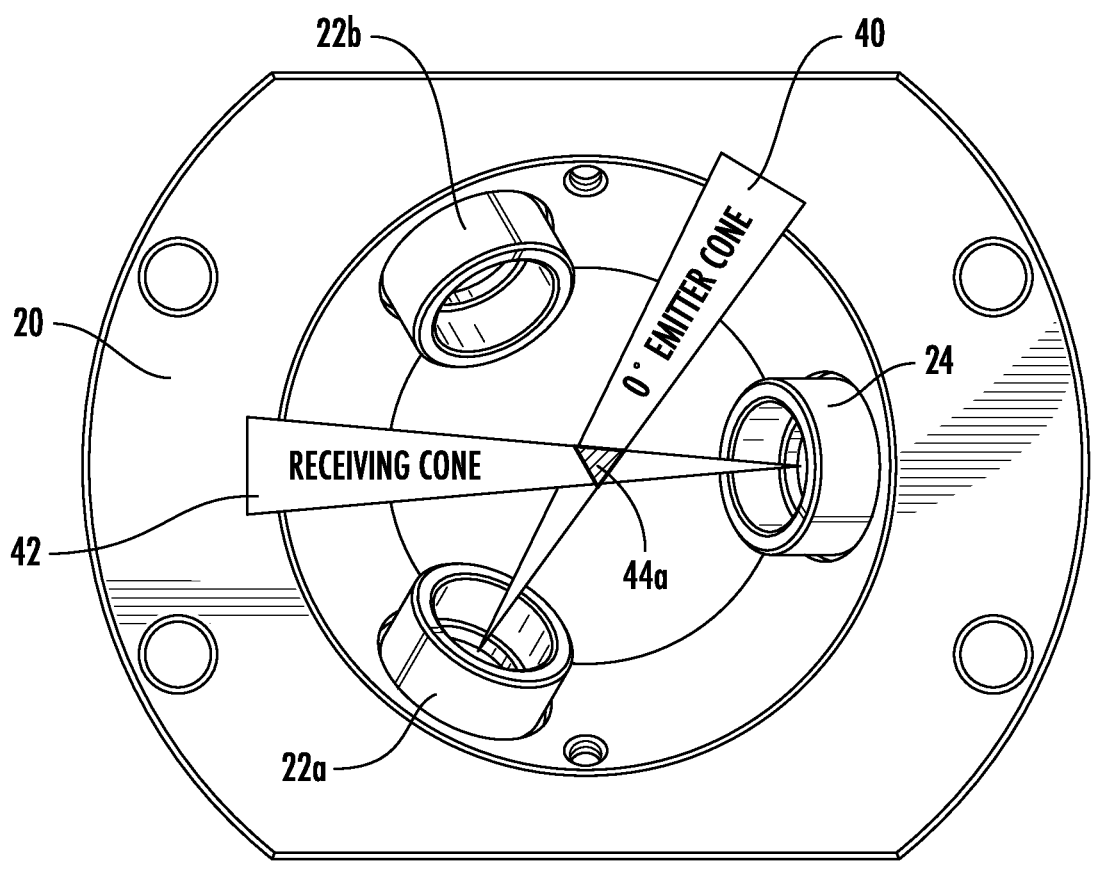
Figure 3C:
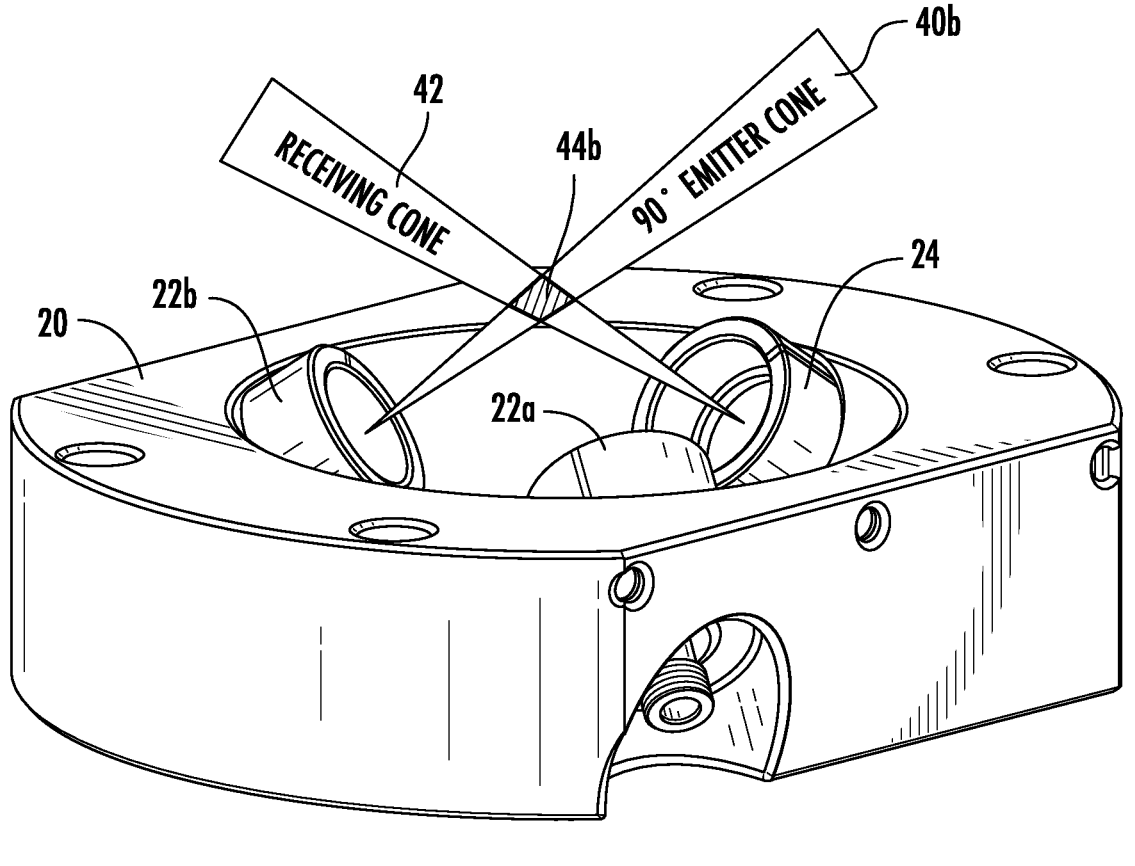

In an embodiment, such as the exemplary illustrations of FIGS. 3A-3C, the detector 20 includes a plurality of light sources 22 and/or a plurality of light sensing devices 24. In such embodiments, the plurality of light sources 22 include at least a first light source 22*a* and a second light source 22*b*. Further, the first light source 22*a* and the second light source 22*b* may emit light at one or more wavelengths, and the one or more wavelengths may be the same, or alternatively, different. In an embodiment, the first light source 22*a* is configured to emit light having a wavelength associated with infrared light and the second light source 22*b* is configured to emit light having a wavelength associated with blue visible light.

With reference to FIGS. 3A-3C, the light emitted from each of the light sources 22 defines an emitter cone 40. Accordingly, in the illustrated, non-limiting embodiment, the first light source 22*a* emits a first emitter cone 40*a*, and the second light source 22*b* emits a second emitter cone 40*b*. As best illustrated in FIG. 3C, each emitter cone 40 increases in diameter away from the surface 36 (shown in FIG. 1) of the detector 20. In the illustrated, non-limiting embodiment of FIGS. 3A-3C, the first emitter cone 40*a* is oriented perpendicular or orthogonal to the second emitter cone 40*b*. In such embodiments, the emitter cones may be separated by 120 degrees in an x-y plane and approximately 37 degrees in the y-z plane to achieve this orthogonality. However, it should be understood that any suitable angle between the first and second emitter cones 40*a*, 40*b* is within the scope of the disclosure. Further, one or more of the light sources 22 may include a polarization filter to perform particle discrimination. In embodiments where multiple light sources 22 include polarization filters, the filters may be aligned perpendicular to one another.

The at least one light sensing device 24 similarly has a receiving cone 42 associated therewith. Further, the volume where each emitting cone 40 overlaps with the receiving cone 42 is defined as a sensing volume 44. In the illustrated, non-limiting embodiment, a first sensing volume 44*a* (FIG. 3B) is defined between the first emitter cone 40*a* and the receiving cone 42 and a second sensing volume 44*b* (FIG. 3C) is defined between the second emitter cone 40*b* and the receiving cone 42.

An example of a detector 20 as illustrated and described herein and a method of operating the detector 20 to detect the presence of a condition or event, such as smoke for example, is set forth in more detail in U.S. Provisional Patent Application Ser. No. 62/397,972 filed on Sep. 22, 2016, the entire contents of which is included herein by reference. As previously mentioned, although an example of a chamberless optical detector is provided herein, other suitable optical detectors, such as chambered optical detectors and duct detectors for example, are also within the scope of the disclosure.

With reference now to FIG. 4A, an example of a calibration system 50 for evaluating the operational sensitivity of a detector, such as detector 20 for example, is shown. In the illustrated, non-limiting embodiment, the calibration system 50 includes a compact and portable micro-flow chamber. As shown, the micro-flow chamber includes a housing 52 that defines an enclosed chamber 54. The housing 52 may be formed from a transparent, flexible material. However, any suitable material is within the scope of the disclosure.

In an embodiment, the housing 52 is positionable in contact with a surface of the detector 20. For example, the housing 52 may include a primary surface 56 configured to abut the sensing surface 36 of the detector. The primary surface 56 of the housing 52 may have a contour generally complementary to the sensing surface 36 of the detector 20 to maximize surface contact therewith and eliminate an air gap between the housing 52 and the detector 20. In the illustrated, non-limiting embodiment, the primary surface 56 of the housing 52 is a planar surface. Further, the overall size (i.e. diameter and thickness) of the housing 52 and internal chamber 54 of the calibration system 50 may be selected such that when the housing 52 is installed onto or adjacent a surface of the detector 20, the internal chamber 54 overlaps or extends through the sensing volume 44 defined between each light source 22 and each light sensing device 24 of the detector 20.

Figure 4B:
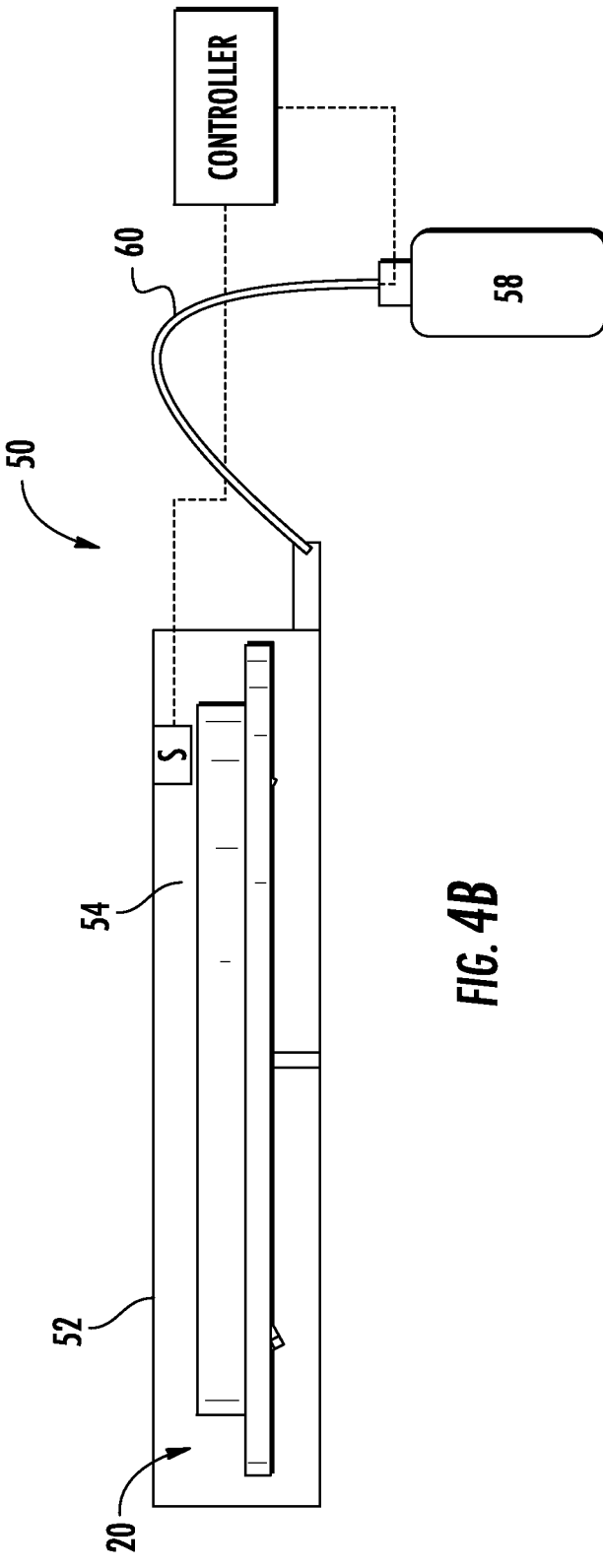
FIG. 4B is a side view of another chambered optical detector including a calibration system according to an embodiment.

With reference to FIG. 4B, in other embodiments, such as in embodiments where the detector 20 is a chambered optical detector, the housing 52 of the calibration system 50 may be sized to receive and enclose the detector 20 within the chamber 54. In such embodiments, one or more wall of the housing 52 may be movable relative to the remainder of the housing 52. Further, the chamber 54 may include a sealed port for electrical connections. These electrical connections may associated with one or more sensors that provide a readout while the detector 20 is positioned within the chamber 54.

Figure 4C:
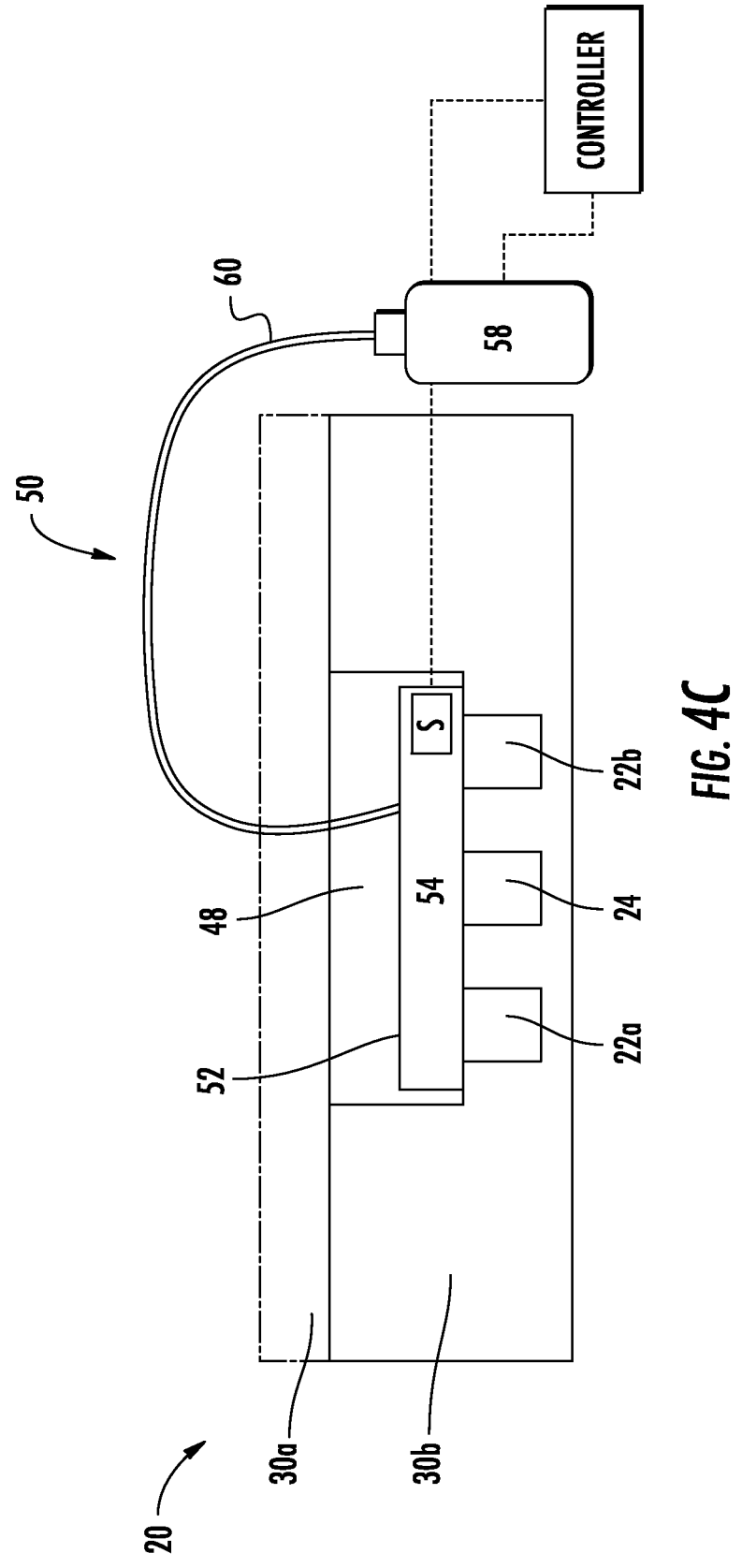
FIG. 4C is a side view of yet another chambered optical detector including a calibration system according to an embodiment.

With reference now to FIG. 4C, in other embodiments, the housing 52 of the calibration system 50 is positionable within an interior chamber 48 of the detector 20. In such embodiments, a first portion 30*a* of the detector body 30, illustrated in broken lines, may be movable relative to a second portion 30*b* of the detector body 30 to provide access to the chamber 48. For example, the first portion 30*a* of the detector body 30 may be a cover that is removable to provide access the interior chamber 48 formed in the second portion 30*b* of the detector body 30. The housing 52 may be removably mounted within the interior chamber 48 such that the housing 52 is positioned within the sensing volumes 44 defined between each light source 22 and each light sensing device 24 of the detector 20.

As shown in FIGS. 4A-4C, a reservoir 58 is arranged in fluid communication with the enclosed chamber 54, such as via a conduit 60 for example. The reservoir 58 includes a flowable material, such as any type of aerosolized particulates, including but not limited to smoke, dust, pollen, and microbials for example. In addition, the material within the reservoir 58 may be a mixture of particulates (aerosols), gases, and/or liquids. The particulates of the material can vary in size, shape, and type. Further, the gases and liquids may be a mixture of multiple samples. In such embodiments, the gases and/or liquids function as the host for particulates and gas molecules that will scatter light provided thereto.

Although only a single reservoir 58 is illustrated in FIGS. 4A-4C, it should be understood that embodiments where the calibration system 50 includes multiple reservoirs arranged in fluid communication with the chamber 54 are also within the scope of the disclosure. In such embodiments, the material within at least one of the reservoirs 58 is different than the material within another of the reservoirs 58. In embodiments where the calibration system 50 includes a plurality of reservoirs 58 arranged in fluid communication with the chamber 54, a flow of material from each of the reservoirs 58 may be provided to the chamber 54 independently or simultaneously.

A flow of material from the one or more reservoirs 58 into the chamber 54 may be precisely controlled, such as by a controller for example, to represent one or more conditions that the detector 20 may experience. In an embodiment, the flow of material into the chamber 54 can be dynamically changed by the controller such that the micro-flow chamber 54 containing the material has one or more desired light scattering properties, also referred to herein as an "obscuration." For example, the flow of material into the chamber 54 is controlled to achieve at least one of a predetermined or known scattering and obscuration properties. Alternatively, the controller may be operable to control the flow of material from the reservoir 58 into the chamber 54 in real time, based on one or more signals communicated to the controller from a sensor, illustrated schematically at S, such as an obscuration sensor configured to measure an obscuration within the chamber 54. Further, the obscuration measured by the one or more sensors S, may be compared with the obscuration measured by the detector 20 to determine whether the detector 20 is calibrated.

In an embodiment, one or more coatings (not shown) may be applied to a portion of the housing 52, such as the primary surface 56 of the housing 52 configured to contact the sensing surface 36 of the detector 20 for example. In an embodiment, an anti-reflective coating is applied to the primary surface 56 of the housing 52 to limit the reflection of light at the primary surface 56. However, in other embodiments, it may be advantageous to apply an absorptive coating to one or more surfaces of the housing 52 other than the primary surface to minimize any effects due to ambient light during calibration.

Figure 5:
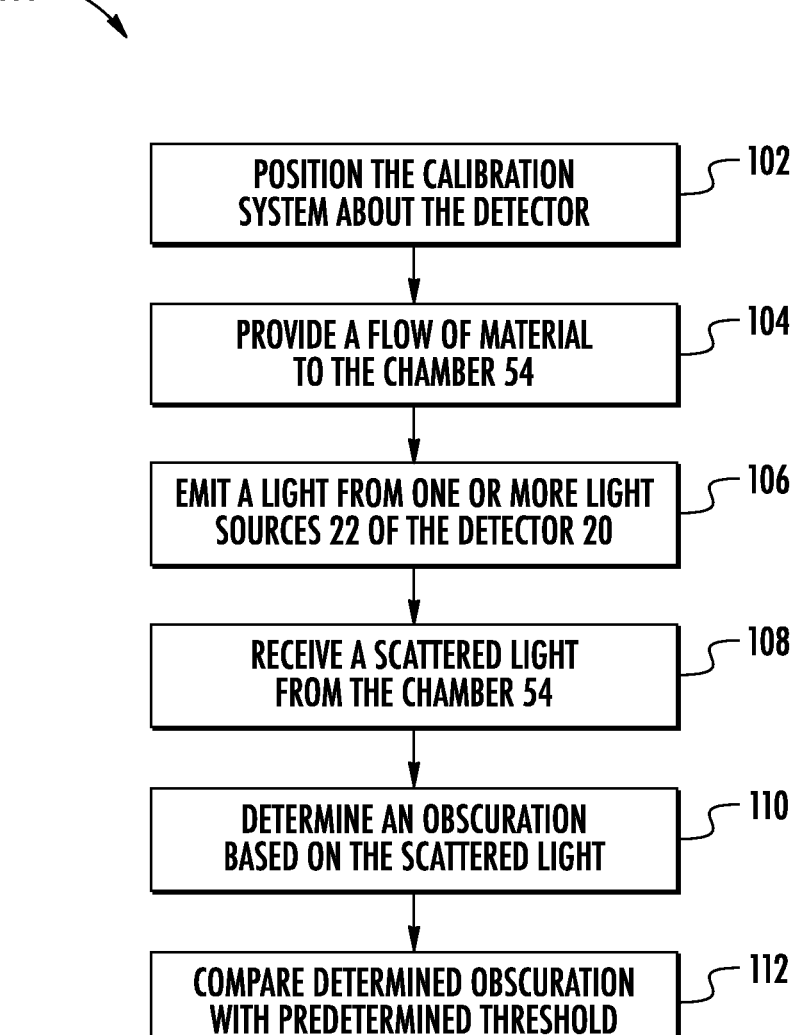
FIG. 5 is a method of calibrating a chamberless optical detector according to an embodiment.

The calibration system 50 is a portable system capable of calibrating a detector 20 at any time prior to installation of the detector 20. Further, in some embodiments, the calibration system 50 may be used to recalibrate an installed detector 20. With reference now to FIG. 5, a method 100 of calibrating a detector, such as detector 20, using the calibration system 50 is provided. In step 102, the calibration system 50 is installed about the detector 20. In the installed position, the primary surface 56 of the housing 52 is positioned in contact with the sensing surface 36 of the detector 20. Installation of the calibration system 50 may occur at a calibration station of the production or manufacturing line of the detector 20. However, it should be understood that one or more steps of the method of calibrating a detector 20 need not be performed during manufacture of the detector 20. For example, calibration can be performed at any location and at any time prior to installation of the detector 20.

In step 104, a flow of material is provided from one or more reservoirs 58 to the chamber 54 of the housing 52, for example when the flow from one or more reservoirs 58 is initiated by a controller. The detector 20 is then operated in step 106 such that at least one light source 22 within the detector 20 emits one or more pulses of light. The one or more pulses of light scatter as they pass through the material within the chamber 54 of the housing 52. In step 108, the scattered light is received by at least one light sensing device 24 of the detector 20 and in step 110, the scattered light received by the at least one light sensing device 24 of the detector 20 is processed by a processing device 26. If the processing device 26 determines a level of obscuration corresponding to a known obscuration, then the detector 20 may be considered calibrated. In an embodiment, the known obscuration is identified by the sensor S positioned within the internal chamber 54. Alternatively, the known obscuration may correlate to the presence of a specific type of material providable to the internal chamber 54.

In an embodiment, the detector 20 may be considered "calibrated" if the level of obscuration identified by the processing device 26 of the detector 20 is within a known and allowable range of the obscuration of the material provided from the reservoir 58 to the chamber 54 (see step 112). If the level of obscuration identified by the processing device 26 is outside of the allowable range, one or more parameters of the processing device 26 are adjusted and the steps indicated in steps 106-112 may be repeated until the level of obscuration is within the allowable range. Examples of one or more parameters that may be adjusted include the light output intensity of the light sources 22, the detector sensitivity, the electronic gain of the circuitry associated with the light sensing device 24, and the scaling factor associated with the responsivity of the light sensitive device 24.

Further, in an embodiment, a plurality of different materials having distinct obscurations may be provided to the chamber independently to perform a multiple point calibration of the detector 20. For example, a first calibration may be performed using a first material provided from a first reservoir 58. If the obscuration identified by the processing device 26 is outside of an allowable range, one or more parameters of the detector 20 may be adjusted and the calibration may be repeated. In an embodiment, each calibration is repeated until the measured obscuration is within the allowable range.

Once the detector 20 is "calibrated" with respect to the first material, i.e. a first calibration point is determined, the chamber 54 is evacuated or emptied and a second material, such as from a second reservoir 58 is provided to the chamber 54. In an embodiment, a "purging air" or other cleaning material may be provided to the chamber between the first material and the second material. Alternatively, a second calibration system 50 may be used. The detector 20 is similarly operated to emit a light and receive a reflected light from the second material. If the obscuration identified by the processing device 26 during this second calibration step is outside of an allowable range, one or more parameters of the detector 20 may be adjusted and the calibration using the second calibration block 50 may be repeated to achieve a second calibration point. Although this multiple point calibration is illustrated and described with respect to two different materials, it should be understood that a calibration process using any number of calibration materials is within the scope of the disclosure.

A calibration system 50 as illustrated and described herein allows for calibration of a detector 20 at any time before installation. Use of liquid and/or gas materials provides flexibility in testing a number of different signal levels and alarm conditions. In addition, the compactness and portability of the hand-held calibration system 50 will make it possible to calibrate several detectors in parallel while providing precise control of the materials delivered from the reservoirs 58 and enhanced repeatability. As a result, calibration will be more efficient compared to existing calibration processes using gaseous materials.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A calibration system for use with a detector comprising:
a housing having an internal chamber, wherein the housing is separate from and is removably positionable in contact with an exterior surface of the detector, within a sensing volume of the detector such that an obscuration of the internal chamber is directly sensible by the detector;
an obscuration sensor operable to monitor an obscuration within the internal chamber;
at least one reservoir arranged in fluid communication with the internal chamber; and
a controller operable to:

selectively supply a flow of material from the at least one reservoir to the internal chamber such that the internal chamber has a known obscuration, wherein selectively supplying the flow of material from the at least one reservoir to the internal chamber includes dynamically controlling the flow of material from the at least one reservoir to the internal chamber in real time based on a sensed obscuration detected within the internal chamber by the obscuration sensor.

2. The calibration system of claim 1, wherein the housing includes a plurality of surfaces and at least one of the plurality of surfaces is formed from a flexible, transparent material.

3. The calibration system of claim 2, wherein the plurality of surfaces includes a primary surface for contacting the detector, the primary surface having a contour complementary to a portion of the detector.

4. The calibration system of claim 3, further comprising an anti-reflective coating applied to the primary surface.

5. The calibration system of claim 2, further comprising an absorptive coating applied to at least one of the plurality of surfaces distinct from the primary surface.

6. The calibration system of claim 1, wherein the detector includes at least one sensing volume, and the internal chamber of the housing is sized to extend through the at least one sensing volume.

7. The calibration system of claim 1, wherein a first surface of the housing is positionable in direct contact with a sensing surface of the detector, the first surface having a contour complementary to the sensing surface of the detector.

8. The calibration system of claim 1, wherein the at least one reservoir includes a first reservoir filled with the first material and a second reservoir filled with a second material, the second material being distinct from the first material.

9. The calibration system of claim 1, wherein the detector is an optical detector.

10. The calibration system of claim 1, wherein the calibration system is mounted within a chamber of the detector.

11. The calibration system of claim 1, wherein the detector is mounted within the internal chamber of the housing.

* * * * *